US012793985B2

(12) United States Patent
Matsubayashi et al.

(10) Patent No.: US 12,793,985 B2
(45) Date of Patent: Nov. 10, 2026

(54) NEGATIVE ELECTRODE AND ZINC SECONDARY BATTERY

(71) Applicant: NGK INSULATORS, LTD., Nagoya-City (JP)

(72) Inventors: Hiroshi Matsubayashi, Suzuka-City (JP); Sota Shimizu, Nagoya-City (JP); Eri Asano, Nagoya-City (JP); Eiichi Hirayama, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 851 days.

(21) Appl. No.: 18/194,677

(22) Filed: Apr. 3, 2023

(65) Prior Publication Data

US 2023/0261204 A1 Aug. 17, 2023

Related U.S. Application Data

(63) Continuation of application No. PCT/JP2021/040993, filed on Nov. 8, 2021.

(30) Foreign Application Priority Data

Dec. 3, 2020 (JP) ................................ 2020-201339

(51) Int. Cl.

*H01M 4/62* (2006.01)
*H01M 4/36* (2006.01)
(Continued)

(52) U.S. Cl.

CPC ........... *H01M 4/628* (2013.01); *H01M 4/364* (2013.01); *H01M 4/38* (2013.01); *H01M 4/48* (2013.01);
(Continued)

(58) Field of Classification Search

CPC ...... H01M 4/621; H01M 4/628; H01M 4/364; H01M 4/38; H01M 4/48; H01M 12/08;
(Continued)

(56) References Cited

U.S. PATENT DOCUMENTS 6,586,139 B1 7/2003 Watanabe et al.
9,293,791 B2 3/2016 Yamada et al.
(Continued)

FOREIGN PATENT DOCUMENTS

EP 1715536 A2 * 10/2006 ............. H01M 4/52
JP S53-070348 A 6/1978
(Continued)

OTHER PUBLICATIONS

Machine translation of JP 53-070348 (no date) (Year: 0000).*
(Continued)

*Primary Examiner* — Amanda C. Walke
(74) *Attorney, Agent, or Firm* — Muncy, Geissler, Olds & Lowe, P.C.

(57) ABSTRACT

A method for enhancing telephony-based customer support systems combines artificial intelligence (AI) and human interaction to streamline issue resolution while maintaining a personal touch. The system transcribes and analyzes customer voice recordings, extracting key terms, sentiment, and severity using AI-driven natural language processing models. Summarized data is displayed to human agents via a graphical interface, enabling them to prioritize interactions and engage customers efficiently. The method includes dynamic queuing based on customizable variables, such as sentiment, severity, loyalty status, and hold time, ensuring critical calls receive prompt attention. This hybrid approach improves customer satisfaction, reduces agent stress, and
(Continued)

Upon charging reaction $ZnO + H_2O + 2e^- \Rightarrow Zn + 2OH^-$ minimizes call handling times, addressing the limitations of fully automated systems while preserving the benefits of human interaction.

15 Claims, 6 Drawing Sheets

(51) Int. Cl.
*H01M 4/38* (2006.01)
*H01M 4/48* (2010.01)
*H01M 12/08* (2006.01)
*H01M 50/417* (2021.01)
*H01M 50/431* (2021.01)
*H01M 50/451* (2021.01)
*H01M 4/02* (2006.01)

(52) U.S. Cl.
CPC ......... *H01M 12/08* (2013.01); *H01M 50/417* (2021.01); *H01M 50/431* (2021.01); *H01M 50/451* (2021.01); *H01M 2004/027* (2013.01)

(58) Field of Classification Search
CPC ............. H01M 50/417; H01M 50/451; H01M 50/431; H01M 2004/027
See application file for complete search history.

(56) References Cited

U.S. PATENT DOCUMENTS

| | | | |
|---|---|---|---|
| 10,290,847 B2 | 5/2019 | Kitoh et al. | |
| 11,387,446 B2 | 7/2022 | Hayashi et al. | |
| 11,404,748 B2 | 8/2022 | Gonda et al. | |
| 2003/0068560 A1 | 4/2003 | Izumi et al. | |
| 2005/0064292 A1 | 3/2005 | Phillips et al. | |
| 2017/0214019 A1 | 7/2017 | Yokoyama et al. | |
| 2020/0411846 A1* | 12/2020 | Yadav | H01M 4/628 |

FOREIGN PATENT DOCUMENTS

| | | | |
|---|---|---|---|
| JP | H07-006759 | A | 1/1995 |
| JP | 2001-216946 | A | 8/2001 |
| JP | 2003-115323 | A | 4/2003 |
| JP | 2007-503100 | A | 2/2007 |
| JP | 2012-527733 | A | 11/2012 |
| JP | 2014-026951 | A | 2/2014 |
| JP | 2016-173936 | A | 9/2016 |
| JP | 6190101 | B2 | 8/2017 |
| JP | 2019-021518 | A | 2/2019 |
| WO | 2010/135331 | A1 | 11/2010 |
| WO | 2013/118561 | A1 | 8/2013 |
| WO | 2016/067884 | A1 | 5/2016 |
| WO | 2016/076047 | A1 | 5/2016 |
| WO | 2018/105178 | A1 | 6/2018 |
| WO | 2020/049901 | A1 | 3/2020 |
| WO | 2020/049902 | A1 | 3/2020 |

OTHER PUBLICATIONS

Machine translation of CN 101740762 (no date) (Year: 0000).*
International Search Report and Written Opinion (Application No. PCT/JP2021/040993) dated Dec. 7, 2021 (with English translation) (11 pages).
Japanese Office Action (Application No. 2022-566801) dated Oct. 23, 2024 (with English translation) (11 pages).

* cited by examiner

Upon charging reaction $ZnO + \boxed{H_2O} + 2e^- \Rightarrow Zn + \boxed{2OH^-}$ Upon discharging reaction $Zn + \boxed{2OH^-} \Rightarrow ZnO + \boxed{H_2O} + 2e^-$ Ex. 5: Amount of nonionic water-absorbing polymer added: 1 part by weight
End of discharge after 40 cycles Ex. 1 (Comp.): No addition of water-absorbing polymer
End of discharge after 40 cycles Ex. 5: Amount of nonionic water-absorbing polymer added: 1 part by weight
End of discharge after deterioration (capacity retention rate of 50%)

Ex. 1 (Comp.): No addition of water-absorbing polymer
End of discharge after deterioration (capacity retention rate of 45%)

NEGATIVE ELECTRODE AND ZINC SECONDARY BATTERY

CROSS-REFERENCE TO RELATED APPLICATIONS

This application is a continuation application of PCT/JP2021/040993 filed Nov. 8, 2021, which claims priority to Japanese Patent Application No. 2020-201339 filed Dec. 3, 2020, the entire contents all of which are incorporated herein by reference.

BACKGROUND OF THE INVENTION

1. Field of the Invention

The present invention relates to a negative electrode and a zinc secondary battery.

2. Description of the Related Art

In zinc secondary batteries such as nickel-zinc secondary batteries, air-zinc secondary batteries, etc., metallic zinc precipitates from a negative electrode in the form of dendrites upon charging, and penetrates into voids of a separator such as a nonwoven fabric and reaches a positive electrode, which is known to result in bringing about short-circuiting. The short circuit due to such zinc dendrites shortens the life in repeated charge/discharge cycles.

In order to deal with the above issues, batteries comprising layered double hydroxide (LDH) separators that prevent penetration of zinc dendrites while selectively permeating hydroxide ions, have been proposed. For example, Patent Literature 1 (WO2013/118561) discloses that an LDH separator is provided between a positive electrode and a negative electrode in a nickel-zinc secondary battery. Moreover, Patent Literature 2 (WO2016/076047) discloses a separator structure comprising an LDH separator fitted or joined to a resin outer frame, and discloses that the LDH separator has a high density to the degree that it has gas impermeability and/or water impermeability. Moreover, this literature also discloses that the LDH separator can be composited with porous substrates. Further, Patent Literature 3 (WO2016/067884) discloses various methods for forming an LDH dense membrane on a surface of a porous substrate to obtain a composite material. This method comprises steps of uniformly adhering a starting material that can impart a starting point for LDH crystal growth to a porous substrate and subjecting the porous substrate to hydrothermal treatment in an aqueous solution of raw materials to form the LDH dense membrane on the surface of the porous substrate.

By the way, another factor that shortens the life of a zinc secondary battery includes a morphological change of zinc which is a negative electrode active material. More specifically, as zinc repeatedly dissolves and precipitates due to repeated charge and discharge, the negative electrode changes its morphology, causing high resistance due to clogging of pores, a decrease in a charge active material due to accumulation of isolated zinc, and the like, which results in difficulty in charge and discharge. In order to address this problem, Patent Literature 4 (WO2020/049902) proposes using as a negative electrode, a combination of ZnO particles and at least two selected from the group consisting of (i) metal Zn particles with a predetermined particle size, (ii) a predetermined metal element, and (iii) a binder resin having a hydroxyl group. According to this negative electrode, it is inhibited from being deteriorated due to repeated charge/discharge cycles to improve its durability in a zinc secondary battery, thereby enabling prolongation of a cycle life.

Moreover, Patent Literature 5 (JP6190101B) discloses a negative electrode mixture containing a negative electrode active material such as metallic Zn and ZnO, a polymer such as an aromatic group-containing polymer, an ether group-containing polymer, or a hydroxyl group-containing polymer, and a conductive aid that is a compound of elements such as B, Ba, Bi, Br, Ca, Cd, Ce, CI, F, Ga, Hg, In, La, and Mn, which is suitable for forming storage batteries that exhibit battery performance such as high cycle characteristics, rate characteristics, and coulomb efficiency, while inhibiting morphological changes of an electrode active material, such as shape change and dendrites of the electrode active material, as well as dissolution, corrosion, and formation of passive state, of the electrode active material.

CITATION LIST

Patent Literature

Patent Literature 1: WO2013/118561
Patent Literature 2: WO2016/076047
Patent Literature 3: WO2016/067884
Patent Literature 4: WO2020/049902
Patent Literature 5: JP6190101B

SUMMARY OF THE INVENTION

Various attempts have been proposed to address the lowering cycle characteristics associated with the morphological change of the zinc negative electrode, as disclosed in Patent Literatures 4 and 5. However, further improvement of the cycle characteristics has been demanded.

The inventors have recently found that by using a mixture containing a predetermined amount of a nonionic water-absorbing polymer together with Zn particles and ZnO particles for a negative electrode, it is possible to inhibit the negative electrode from being deteriorated due to repeated charge/discharge cycles to improve its durability in a zinc secondary battery, thereby enabling prolongation of the cycle life.

Therefore, an object of the present invention is to provide a negative electrode that is inhibited from being deteriorated due to repeated charge/discharge cycles to improve its durability, thereby enabling prolongation of the cycle life.

According to an aspect of the present invention, there is provided a negative electrode for use in a zinc secondary battery, comprising:

- a negative electrode active material comprising ZnO particles and Zn particles, and
- a nonionic water-absorbing polymer,
- wherein the negative electrode comprises the nonionic water-absorbing polymer in an amount of 0.01 to 6.0 parts by weight on a solid basis, based on the content of the ZnO particles being 100 parts by weight.

According to another aspect of the present invention, there is provided a zinc secondary battery, comprising:

- a positive electrode,
- the negative electrode,
- a separator separating the positive electrode from the negative electrode so as to be capable of conducting hydroxide ions therethrough, and
- an electrolytic solution.

DETAILED DESCRIPTION OF THE INVENTION

The negative electrode of the present invention is a negative electrode used in zinc secondary batteries. The negative electrode contains a negative electrode active material and a nonionic water-absorbing polymer. The negative electrode active material contains ZnO particles and Zn particles. In particular, this negative electrode contains the nonionic water-absorbing polymer in an amount 0.01 to 6.0 parts by weight on a solid basis, based on the content of ZnO particles being 100 parts by weight. In this way, by using a mixture containing a predetermined amount of the nonionic water-absorbing polymer together with the Zn particles and ZnO particles in the negative electrode, it is possible to inhibit the negative electrode from being deteriorated due to repeated charge/discharge in a zinc secondary battery to improve its durability, thereby enabling prolongation of the cycle life.

Figure 1A:
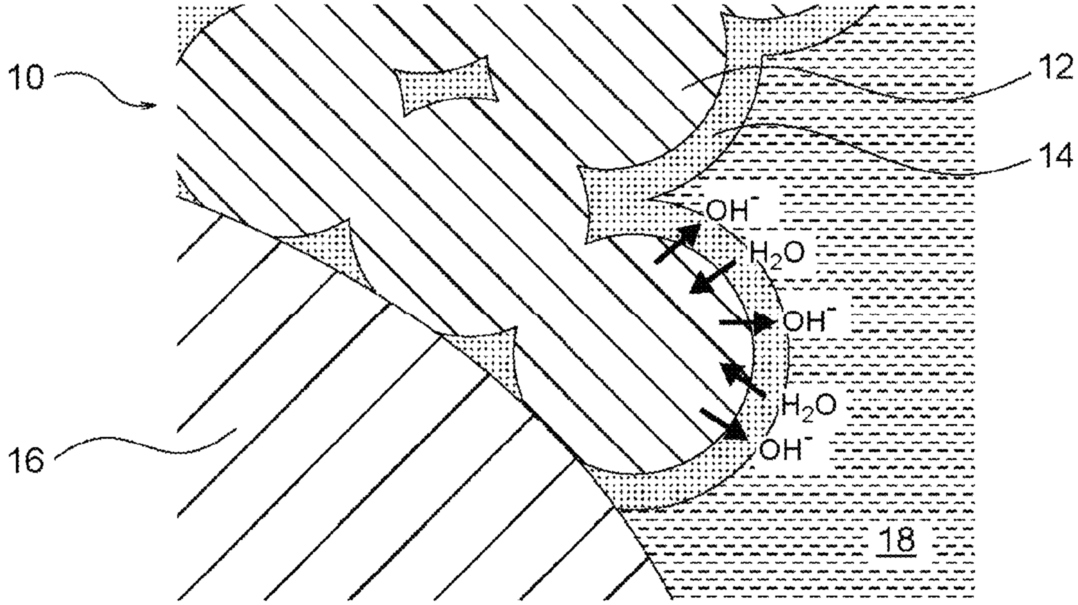
FIG. 1A shows a conceptual view explaining a presumed mechanism of the phenomenon that occurs upon charging reaction of the negative electrode according to the present invention.
Figure 1B:
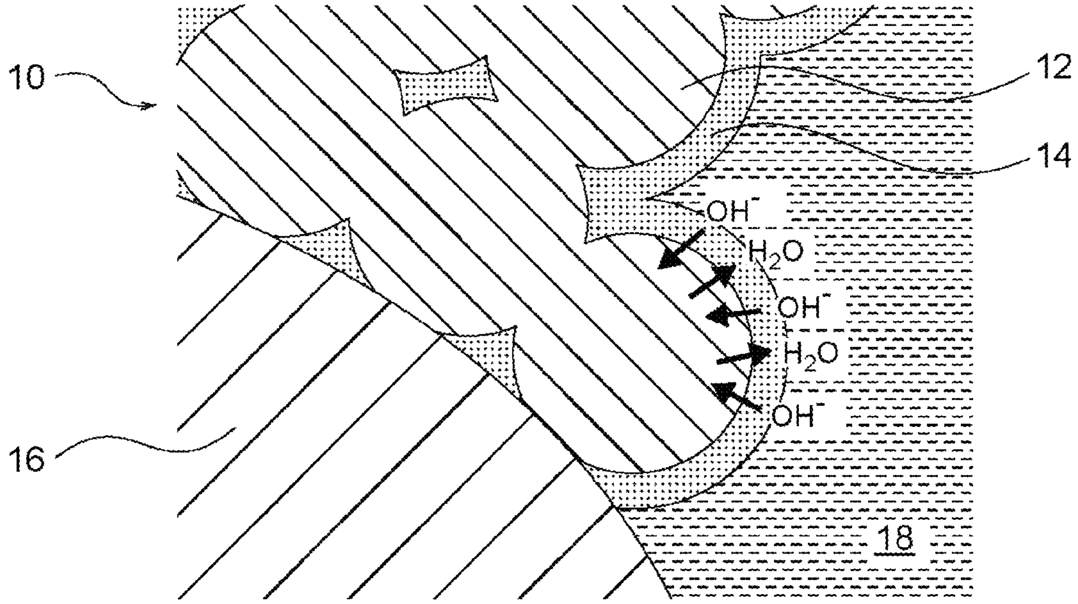
FIG. 1B shows a conceptual view explaining a presumed mechanism of the phenomenon that occurs upon discharging reaction of the negative electrode according to the present invention.

As described above, in conventional negative electrodes, as zinc repeatedly dissolves and precipitates by repeated charge/discharge, the negative electrode changes its morphology, causing high resistance due to clogging of pores and a decrease in a charge active material due to accumulation of isolated zinc, which results in difficulty in charge and discharge. These problems can be effectively inhibited or solved by adding a nonionic water-absorbing polymer to the negative electrode. The mechanism is not clear, however, it is considered to be due to the fact that the nonionic water-absorbing polymer has characteristics of change in liquid absorbency in response to variation of pH. For example, it is conjectured, because the nonionic water-absorbing polymer may have characteristics of releasing water as its water absorption capacity lowers with increasing pH, thereby causing the following phenomenon. The microscopic structure of a negative electrode 10 is conceptually illustrated in FIGS. 1A and 1B. In these figures, negative electrode 10 contains a negative electrode active material 12 arranged on a current collector 16 and a nonionic water-absorbing polymer 14 covering negative electrode active material 12, and is depicted in a state of being immersed in an electrolytic solution 18. First, as shown in FIG. 1A, upon charging reaction, the reaction proceeds at negative electrode 10 based on $ZnO+H_2O+2e^- \rightarrow Zn+2OH^-$, however, as the $OH^-$ increases, i.e., as the pH increases, nonionic water-absorbing polymer 14 lowers its liquid absorption capacity and releases retained water into negative electrode active material 12, allowing the above charging reaction to be assisted. Namely, nonionic water-absorbing polymer 14 conveniently supplying water to the charging reaction in which water is consumed, continues the charging reaction. As shown in FIG. 1B, on the other hand, in discharging reaction, the reaction proceeds based on $Zn+2OH^- \rightarrow ZnO+H_2O+2e^-$, however, as the $OH^-$ decreases, i.e., as the pH decreases, nonionic water-absorbing polymer 14 increases its liquid absorption capacity and absorbs water produced in negative electrode active material 12, allowing the above discharging reaction to be assisted. In other words, nonionic water-absorbing polymer 14 conveniently absorbing water for the discharging reaction in which water is produced, continues the discharging reaction. Thus, it is considered that nonionic water-absorbing polymer 14 absorbs or releases water due to pH variations upon the charging and discharging reaction, thereby allowing the reaction inside negative electrode 10 to continue and uniformly proceed, as a result of which negative electrode 10 is inhibited for being deteriorated due to the repeated charge/discharge cycles, to improve its durability, thereby leading to prolonging of the cycle life. In this regard, it is considered that in a case in which the reaction inside negative electrode 10 cannot be continued, battery reaction will intensively proceed only in sites where electrolytic solution 18 is abundant (for example, only in the vicinity in a case in which nonwoven fabric is included), as a result of which negative electrode active material 12 is unevenly used, causing capacity reduction. Incidentally, the advantageous effect of the present invention described above is a peculiar effect of the choice of nonionic water-absorbing polymer 14. In fact, addition of an ionic absorption polymer (for example, a polyacrylic acid or potassium polyacrylate) fails to enable the effects described above to be obtained, rather, reduces cycle characteristics.

Negative electrode active material 12 contains Zn particles and ZnO particles. The Zn particles are typically metallic Zn particles, however, Zn alloys or particles of a Zn compound may also be used. Metallic Zn particles that are commonly used in zinc secondary batteries can be used, however, smaller metal Zn particles are more preferably used from the standpoint of prolonging the cycle life of the battery. Specifically, the average particle diameter D50 of the metallic Zn particles is preferably 5 to 200 μm, more preferably 50 to 200 μm, and still more preferably 70 to 160 μm. The preferred content of Zn particles in negative electrode 10 is preferably 1.0 to 87.5 parts by weight, more preferably 3.0 to 70.0 parts by weight, and still more preferably 5.0 to 55.0 parts by weight, based on the content of ZnO particles being 100 parts by weight. The metallic Zn particle may be doped with dopants such as In and Bi. The ZnO particles are not particularly restricted provided that commercially available zinc oxide powder used for a zinc secondary battery or zinc oxide powder obtained by growing particles by a solid phase reaction, etc., by using these powders as starting materials, may be used. The average particle diameter D50 of the ZnO particles is preferably 0.1 to 20 μm, more preferably 0.1 to 10 μm, and still more preferably 0.1 to 5 μm. Note, however, the average particle diameter D50 used herein shall refer to a particle diameter at which the integrated volume from the small particle diameter side reaches 50% in a particle size distribution obtained by a laser diffraction and scattering method. Preferably negative electrode 10 further contains one or more metallic elements selected from the group consisting of In and Bi. These metal elements can inhibit undesirable hydrogen gas from generating due to self-discharge of negative electrode 10. These metallic elements may be contained in negative electrode 10 in any form, such as metal, oxide, hydroxide, or other compounds, however, they are preferably contained in the form of oxide or hydroxide, more preferably in the form of oxide particles. The oxide of the metal element includes, for example, $In_2O_3$, $Bi_2O_3$, etc. The hydroxide of the metal element includes, for example, $In(OH)_3$, $Bi(OH)_3$, etc. In any case, preferably the content of In is 0 to 2 parts by weight in terms of oxide and the content of Bi is 0 to 6 parts by weight in terms of oxide, and more preferably the content of In is 0 to 1.5 parts by weight in terms of oxide and the content of Bi is 0 to 4.5 parts by weight in terms of oxide, based on the content of ZnO particles being 100 parts by weight. When In and/or Bi are contained in negative electrode 10 in the form of oxide or hydroxide, not all of In and/or Bi need to be in the form of oxide or hydroxide, and they may be partially contained in the negative electrode in other forms such as metal or other compounds. For example, the above metal elements may be doped as trace elements in the metallic Zn particles. In this case, the concentration of In in the metallic Zn particles is preferably 50 to 2000 ppm by weight, more preferably 200 to 1500 ppm by weight, and the concentration of Bi in the metallic Zn particles is preferably 50 to 2000 ppm by weight and more preferably 100 to 1300 ppm by weight.

Figure 2:
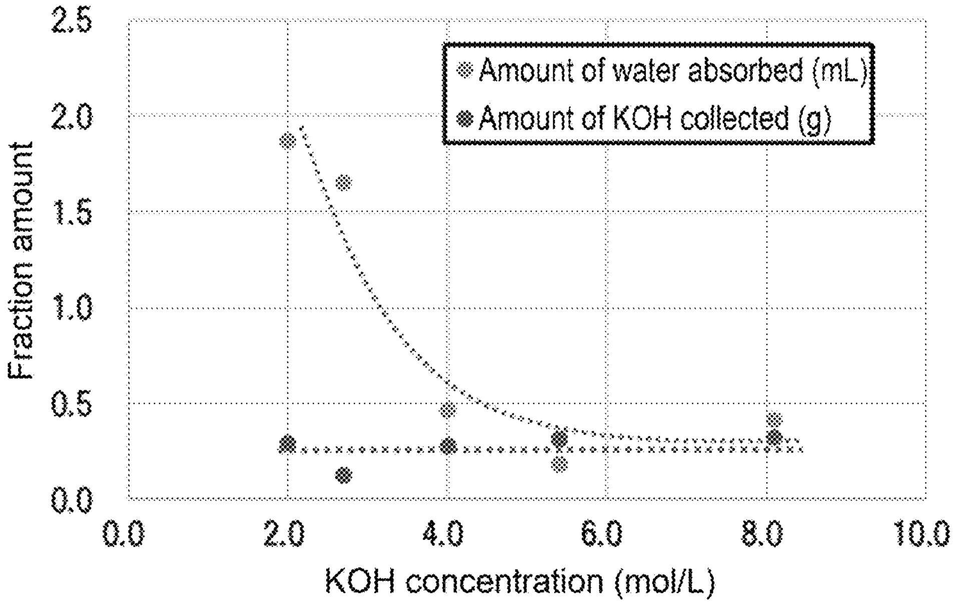
FIG. 2 is a graph illustrating an example of the relationship between the amount of water absorbed and the amount of KOH collected per 1 $cm^3$ of a nonionic water-absorbing polymer, and the KOH concentration.

Nonionic water-absorbing polymer 14 can be any commercially available nonionic water-absorbing polymer, however, as described above, it is preferably a polymer having characteristics of change in liquid absorbency in response to variation of pH. FIG. 2 shows an example of the relationship between the amount of water absorbed and the amount of KOH collected per 1 $cm^3$ of such a nonionic water-absorbing polymer, and the KOH concentration. As shown in FIG. 2, a nonionic water-absorbing polymer in which the amount of water absorbed changes with change in the KOH concentration in an electrolytic solution (i.e., change in the pH) but the amount of KOH collected does not change significantly, is preferred in terms of being capable of absorbing or releasing only water due to variation of pH. In particular, a nonionic water-absorbing polymer that demonstrates a behavior whereby the amount of water absorbed lowers with increasing pH is preferred. Preferred examples of such nonionic water-absorbing polymers 14 include a polyalkylene oxide-based water-absorbing resin, a polyvinylacetamide-based water-absorbing resin, polyvinyl alcohol (PVA resin), and polyvinyl butyral (PVB resin), and more preferred examples thereof include a polyalkylene oxide-based water-absorbing resin. The polyalkylene oxide-based water-absorbing resins that are commercially available can be used. The nonionic water-absorbing polymer may contain at least one selected from the group consisting of a hydrophilic ether group, a hydroxyl group, an amide group, and an acetamide group. The presence of these functional groups allows for water absorption and desorption functions that are more desirable for battery reactions. The nonionic water-absorbing polymer may be present as a particle in the negative electrode or may cover the active material. When the active material is covered with the nonionic water-absorbing polymer, a method for preparing a nonionic water-absorbing polymer in slurry form followed by addition of the slurry polymer, or a method for heating and melting the nonionic water-absorbing polymer upon production, may be contemplated. In the latter case, the melting point of the nonionic water-absorbing polymer is preferably 45° C. to 350° C., more preferably 45° C. to 200° C., and still more preferably 50° C. to 100° C.

The content of nonionic water-absorbing polymer 14 in negative electrode 10 is preferably 0.01 to 6.0 parts by weight on a solid basis, more preferably 0.01 to 5.5 parts by weight, still more preferably from 0.05 to 5.0 parts by weight, and particularly preferably 0.07 to 4.0 parts by weight, based on the content of the ZnO particles being 100 parts by weight. Nonionic water-absorbing polymer 14 is preferably in particulate form. In this case, the particle size of nonionic water-absorbing polymer 14 is preferably 10 to 200 μm, more preferably 15 to 180 μm, still more preferably 20 to 160 μm, and particularly preferably 30 to 150 μm. Not all of the particles of nonionic water-absorbing polymer 14 need to stay within the above numerical range, provided that the average particle diameter D50 falls within the above numerical range.

Negative electrode 10 may further contain a conductive aid. Examples of the conductive aid include carbon, metal powders (tin, lead, copper, cobalt, and the like), and noble metal pastes.

Negative electrode 10 may further contain a binder resin (not shown). The negative electrode 10 comprising the binder maintains the shape of the negative electrode more easily. Various known binders can be used as the binder resin and a preferable example thereof is polyvinyl alcohol (PVA) and polytetrafluoroethylene (PTFE). Both PVA and PTFE are particularly preferably combined for use as the binder.

The negative electrode 10 is preferably a sheet-like pressed product, and thereby it is possible to prevent the negative electrode active material 12 from falling off and improve the electrode density, which more effectively inhibits the morphological change of the negative electrode 10. Such a sheet-like pressed product can be fabricated by adding a binder to a negative electrode material followed by kneading, and pressing the obtained kneaded product by a roll press machine, etc., into a sheet.

A current collector 16 is preferably provided on the negative electrode 10. The current collector 16 preferably includes, for example, a copper punching metal and a copper expanded metal. In this case, for example, a negative electrode plate composed of negative electrode 10/current collector 16 can be favorably fabricated by coating a surface of a copper punching metal or a copper expanded metal with a mixture containing Zn particles, ZnO particles, solder, and a binder resin (for example, polytetrafluoroethylene particles), if necessary. At this time, the negative electrode plate (i.e., the negative electrode 10/the current collector 16) after drying is also preferably subjected to press treatment to prevent the negative electrode active material 12 from falling off and improve the electrode density. Alternatively, the sheet-like pressed product as described above may be compressed and bonded to a current collector 16 such as a copper expanded metal.

Zinc Secondary Battery

The negative electrode 10 of the present invention is preferably applied to a zinc secondary battery. Therefore, according to a preferred embodiment of the present invention, a zinc secondary battery comprising a positive electrode (not shown), a negative electrode 10, a separator separating the positive electrode from the negative electrode 10 so as to be capable of conducting hydroxide ions therethrough, and an electrolytic solution 18, is provided. The zinc secondary battery of the present invention is not particularly limited provided that it is a secondary battery in which negative electrode 10 described above is used and an electrolytic solution 18 (typically an aqueous alkali metal hydroxide solution) is used. Therefore, it can be a nickel-zinc secondary battery, a silver oxide-zinc secondary battery, a manganese oxide-zinc secondary battery, a zinc-air secondary battery, or various other alkaline-zinc secondary batteries. For example, a positive electrode preferably comprises nickel hydroxide and/or nickel oxyhydroxide whereby the zinc secondary battery forms a nickel-zinc secondary battery. Alternatively, the positive electrode may be an air electrode whereby the zinc secondary battery forms a zinc-air secondary battery.

The separator is preferably a layered double hydroxide (LDH) separator. As described above, LDH separators have been known in the field of nickel-zinc secondary batteries or zinc-air secondary batteries (see Patent Literatures 1 to 3), and an LDH separator can also be preferably used for the zinc secondary battery of the present invention. The LDH separator can prevent the penetration of zinc dendrites while selectively allowing hydroxide ions to permeate. Combined with the effect of adopting the negative electrode of the present invention, the durability of the zinc secondary battery can be further improved. Incidentally, the LDH separator herein is defined as a separator including a layered double hydroxide (LDH) and/or an LDH-like compound (hereinafter collectively referred to as a hydroxide ion-conducting layered compound), which selectively passes hydroxide ions by exclusively utilizing hydroxide ion conductivity of the hydroxide ion-conducting layered compound. The "LDH-like compound" herein, although it may not be called an LDH, is hydroxide and/or oxide with a layered crystal structure analogous to LDH, and can be considered as an equivalent of LDH. In a broader definition, however, "LDH" can also be interpreted to include not only LDH but also the LDH-like compound.

The LDH separator may be composited with porous substrates as disclosed in Patent Literatures 1 to 3. The porous substrate may be composed of any of ceramic materials, metallic materials, and polymer materials; however, it is particularly preferably composed of the polymer materials. The polymer porous substrate has advantages of 1) flexibility (hence, it is hard to break even if being thin.), 2) facilitation of increase in porosity, 3) facilitation of an increase in conductivity (because it can be rendered thin while increasing porosity.), and 4) facilitation of manufacture and handling. The polymer material is particularly preferably polyolefins such as polypropylene, polyethylene, etc., and most preferably polypropylene, in terms of excellent hot-water resistance, excellent acid resistance and excellent alkali resistance as well as low cost. When the porous substrate is composed of the polymer material, a hydroxide ion-conducting layered compound is particularly preferably incorporated over the entire region of the thickness direction of the porous substrate (for example, most or almost all the pores inside the porous substrate are filled with the hydroxide ion-conducting layered compound.). In this case, the thickness of the polymer porous substrate is preferably 5 to 200 μm, more preferably 5 to 100 μm, and still more preferably 5 to 30 μm. A microporous membrane that is commercially available as a separator for lithium batteries can be preferably used as such polymer porous substrates.

The electrolytic solution 18 preferably comprises an alkali metal hydroxide aqueous solution. The alkali metal hydroxide includes, for example, potassium hydroxide, sodium hydroxide, lithium hydroxide, ammonium hydroxide, etc., however, potassium hydroxide is more preferred. Zinc oxide, zinc hydroxide, etc., may be added to the electrolytic solution in order to inhibit spontaneous dissolution of the zinc-containing material.

EXAMPLES

The present invention will be described in more detail with reference to the following Examples.

Examples 1 to 50

(1) Preparation of Positive Electrode

A paste-type nickel hydroxide positive electrode (capacity density: about 700 mAh/$cm^3$) was prepared.

(2) Fabrication of Negative Electrode

Various raw material powders shown below were prepared.

- ZnO powder (manufactured by Seido Chemical Industry Co., Ltd., JIS Standard Class 1 grade, average particle size D50: 0.2 μm)
- Metallic Zn powder (doped with Bi and In, Bi: 70 ppm by weight, In: 200 ppm by weight, average particle diameter D50: 120 μm, manufactured by Dowa Electronics Materials Co., Ltd.)
- $In_2O_3$ powder (manufactured by High Purity Chemical Laboratory Co., Ltd., purity: 99.99%, average particle size D50: adjusted to 1.0 μm)
- $Bi_2O_3$ powder (manufactured by High Purity Chemical Laboratory Co., Ltd., purity: 99.99%, average particle size D50: adjusted to 1.0 μm)
- Nonionic water-absorbing polymer (polyalkylene oxide-based water-absorbing resin, Aqua Calk, grade: TWB-P, product form: powder, average particle diameter D50: 50 μm or 130 μm, manufactured by Sumitomo Seika Chemicals Co., Ltd.)
- Ionic water-absorbing polymer (polyacrylic acid, AQUPEC HV, manufactured by Sumitomo Seika Chemicals Co., Ltd.)
- Ionic water-absorbing polymer (potassium polyacrylate, Poly partial potassium salt, manufactured by Sigma-Aldrich Co. LLC)

According to the compounding proportions listed in Tables 1 and 2, to ZnO powder were added metallic Zn powder, polytetrafluoroethylene (PTFE), as well as $In_2O_3$ powder, $Bi_2O_3$ powder and/or a nonionic water absorbing polymer, if necessary, and the mixture was kneaded with propylene glycol. In Examples 17 to 19, 21 to 23, 27 to 29, and 41 to 43, the nonionic water-absorbing polymer was dispersed in water and added in slurry form. The obtained kneaded product was rolled by a roll press to obtain a negative electrode active material sheet. The negative electrode active material sheet was compressed and adhered to a tin-plated copper expanded metal to obtain a negative electrode.

(3) Preparation of Electrolytic Solution

Ion-exchanged water was added to a 48% potassium hydroxide aqueous solution (manufactured by Kanto Chemical Co., Inc., special grade) to adjust the KOH concentration to 5.4 mol %, and then zinc oxide was dissolved at 0.42 mol/L by heating and stirring to obtain an electrolytic solution.

(4) Fabrication of Evaluation Cell

The positive electrode and the negative electrode were each wrapped with a nonwoven fabric, and each welded with a current extraction terminal. The positive electrode and the negative electrode thus fabricated were opposed to each other with the LDH separator interposed therebetween, sandwiched by a laminated film provided with a current extraction port, and the laminated film was heat-sealed on three sides thereof. The electrolytic solution was added to the obtained cell container with the upper side being opened, and was sufficiently permeated into the positive electrode and the negative electrode by vacuum evacuation, etc. Thereafter the remaining one side of the laminated film was also heat-sealed to form a simply sealed cell.

(5) Evaluation

<Cycle Characteristics>

Chemical conversion was carried out on the simply sealed cell with 0.1 C charge and 0.2 C discharge by using a charge/discharge apparatus (TOSCAT3100 manufactured by Toyo System Co., Ltd.). Then, a 1 C charge/discharge cycle was carried out. Repeated charge/discharge cycles were carried out under the same conditions, and the number of charge/discharge cycles until a discharging capacity decreased to 70% of the discharging capacity of the first cycle of the prototype battery was recorded, the procedure of which was adopted as an indicator of cycle characteristics. The results are as shown in Tables 1 to 3, confirming that the addition of the nonionic water-absorbing polymer improved the cycle characteristics for each negative electrode with various compositions. The results shown in Table 3 also confirmed that the addition of the ionic water-absorbing polymer rather lowers the cycle characteristics.

<Microstructural Observation after 40 Cycles>

Figure 3:
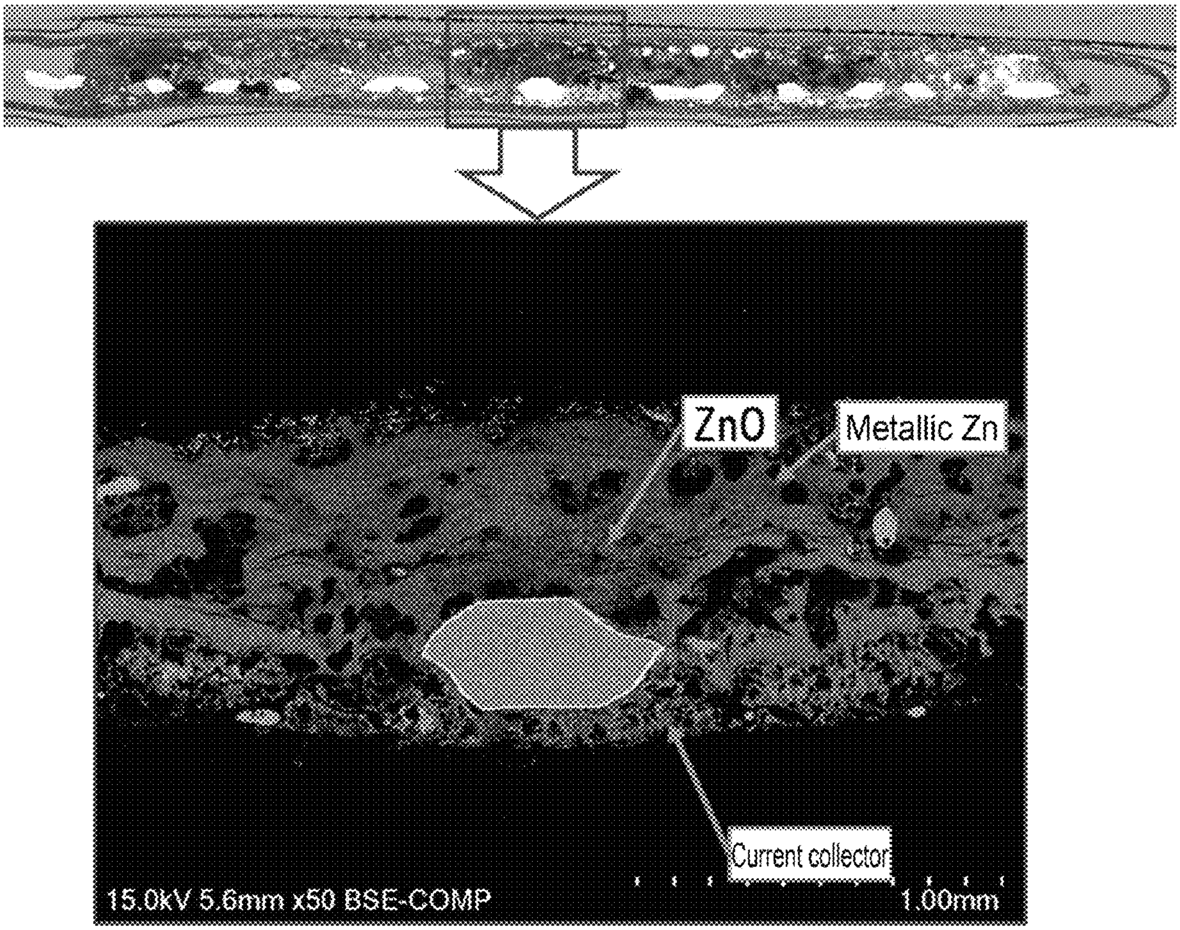
FIG. 3 shows a cross-sectional image of a negative electrode, observed by SEM in an end-of-discharge state of immediately after 40 charge/discharge cycles in the evaluation cell of Example 5, containing a nonionic water-absorbing polymer.
Figure 4:
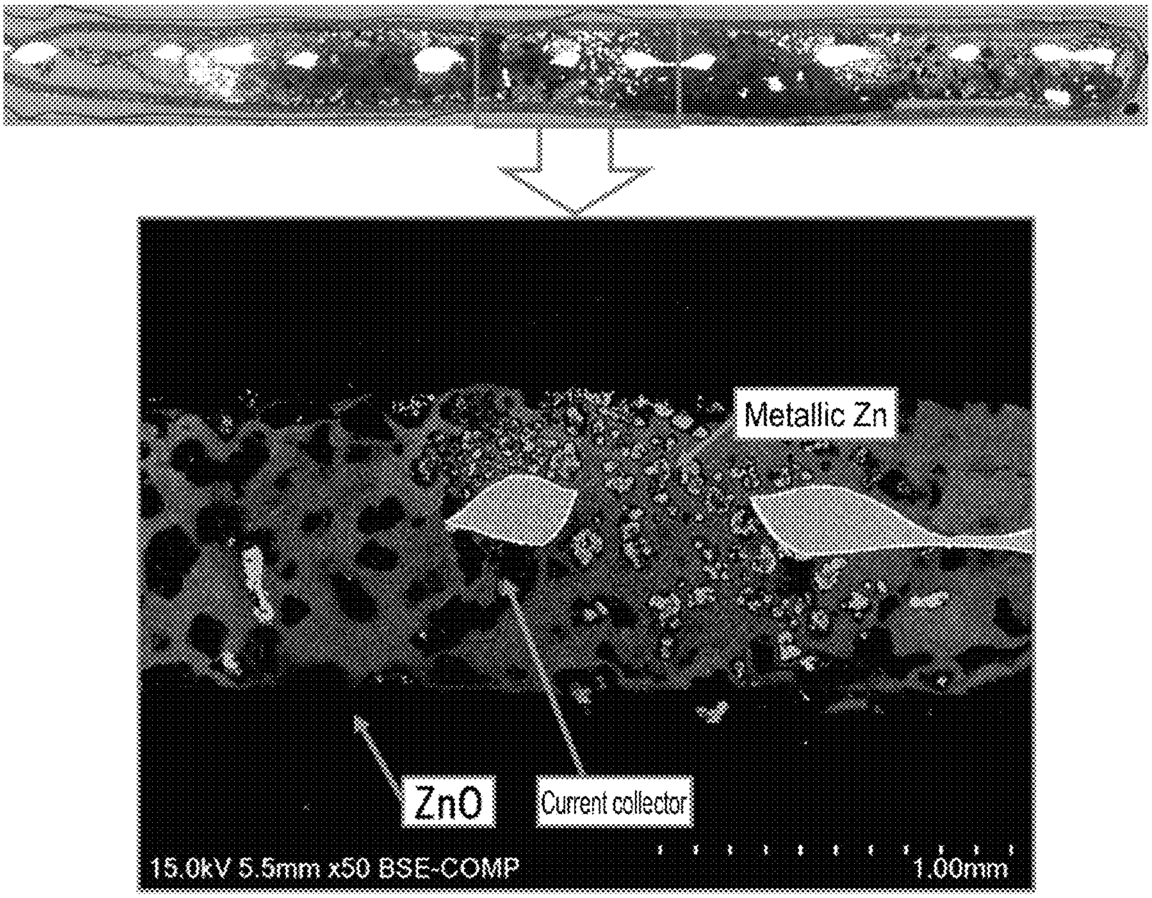
FIG. 4 shows a cross-sectional image of a negative electrode, observed by SEM in an end-of-discharge state immediately after 40 charge/discharge cycles in the evaluation cell of Example 1 (Comparative Example), containing no nonionic water-absorbing polymer.

In the evaluation cell of Example 5, containing the nonionic water-absorbing polymer, the cross section of the negative electrode in an end-of-discharge state immediately after 40 charge/discharge cycles was observed by SEM, and the image shown in FIG. 3 was obtained. Similarly, in the evaluation cell of Example 1 (Comparative Example), not containing the nonionic water-absorbing polymer, the cross section of the negative electrode in an end-of-discharge state immediately after 40 charge/discharge cycles was observed by SEM, and the image shown in FIG. 4 was obtained. In the negative electrode of FIG. 4, without the addition of the nonionic water-absorbing polymer, a number of sites where the metallic Zn was unevenly distributed and isolated were observed inside the negative electrode. In the negative electrode in FIG. 3, with the addition of the nonionic water-absorbing polymer, on the contrary, there was observed that the metallic Zn was significantly inhibited form being unevenly distributed inside the negative electrode, rendering the reaction inside the negative electrode uniform, which is considered to have contributed to the improvement of cycle properties.

<Microstructural Observation after Deterioration>

Figure 5:
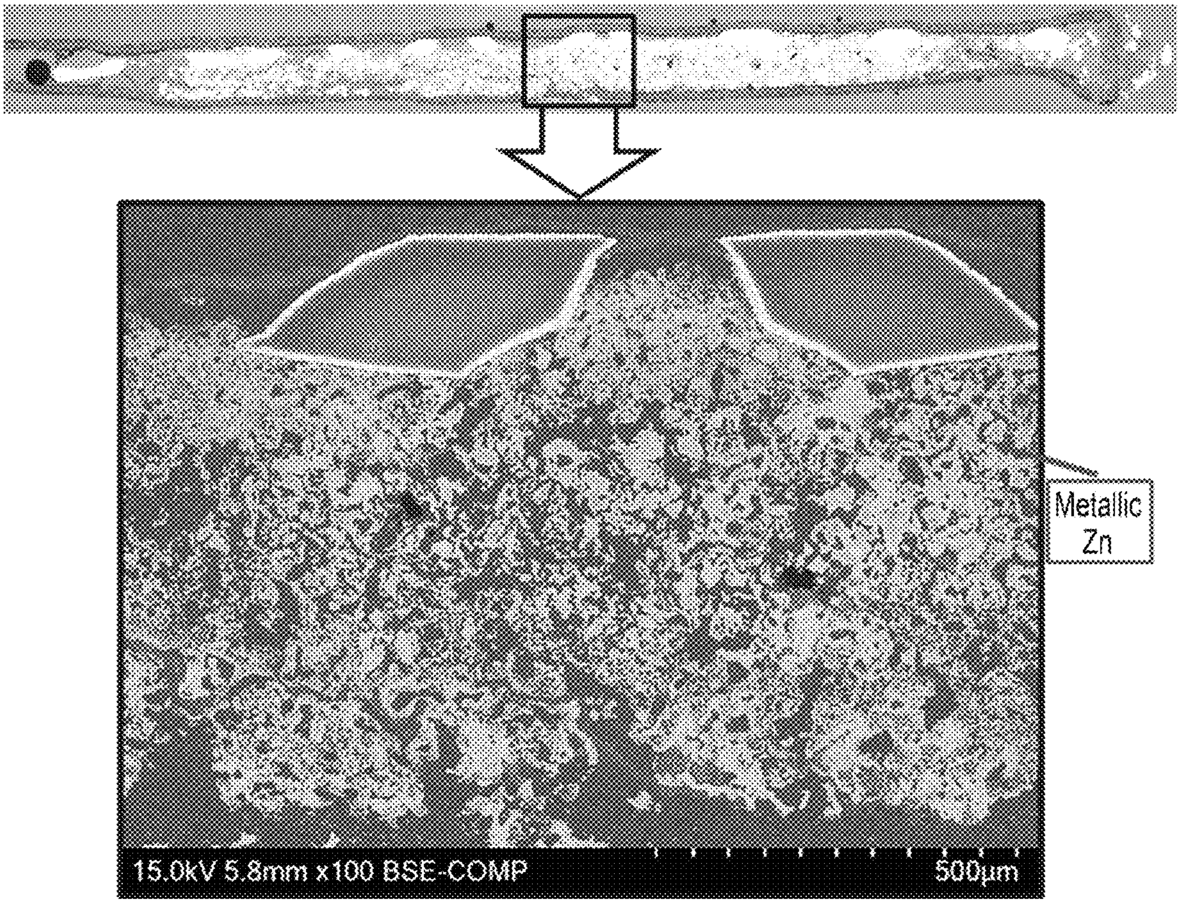
FIG. 5 shows a cross-sectional image of a negative electrode, observed by SEM in an end-of-discharge state when deteriorated to 50% of a capacity retention rate by repeated charge/discharge cycles, in the evaluation cell of Example 5, containing a nonionic water-absorbing polymer.
Figure 6:
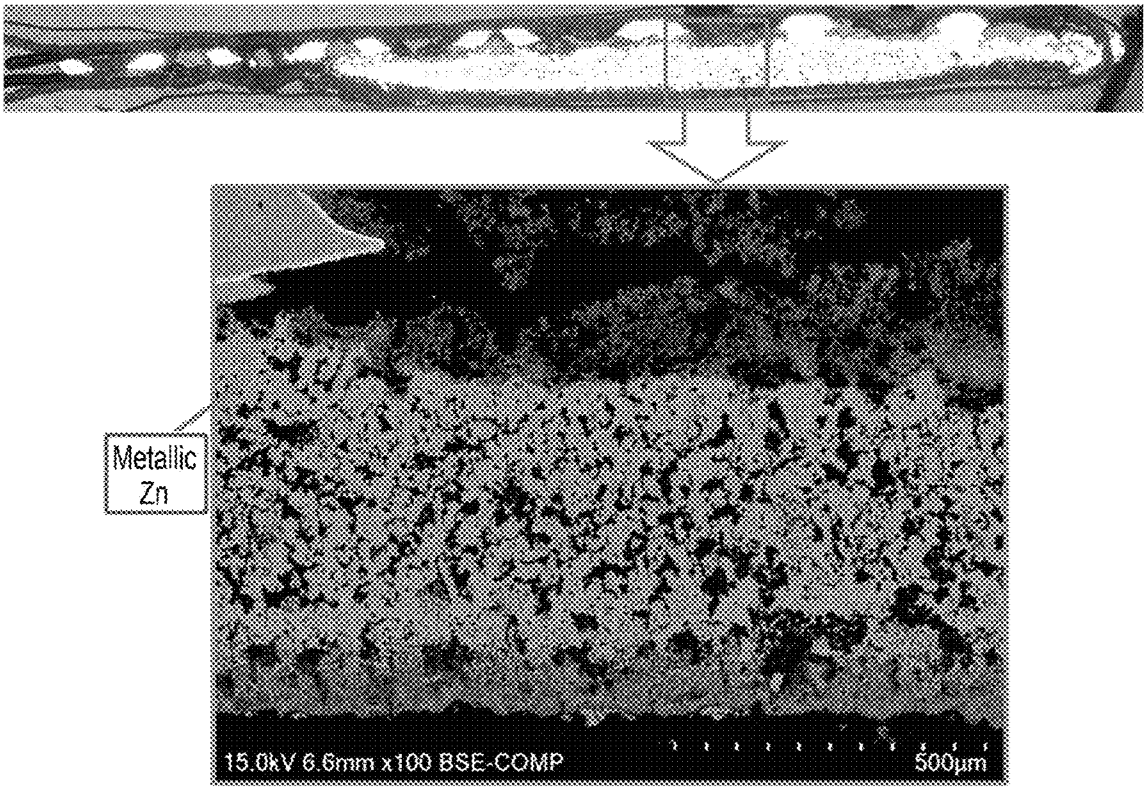
FIG. 6 shows a cross-sectional image of a negative electrode, observed by SEM in an end-of-discharge state when deteriorated to 45% of a capacity retention rate by repeated charge/discharge cycles, in the evaluation cell of Example 1 (Comparative Example), containing no nonionic water-absorbing polymer.

In the evaluation cell of Example 5, containing the nonionic water-absorbing polymer, the cross-section of the negative electrode in an end-of-discharge state when deteriorated to 50% of a capacity retention rate by repeated charge/discharge cycles described above, was observed by SEM, the image shown in FIG. 5 was obtained. Similarly, in the evaluation cell of Example 1 (Comparative Example), not containing the nonionic water-absorbing polymer, the cross-section of the negative electrode in an end-of-discharge state when deteriorated to 45% of a capacity retention rate by repeated charge/discharge cycles described above, was observed by SEM, the image shown in FIG. 6 was obtained. In the negative electrode shown in FIG. 6, without the addition of the nonionic water-absorbing polymer, the metallic Zn shown in white in the figure was unevenly accumulated, and the morphological change (macroscopic shape change) of the negative electrode was significantly observed. In the negative electrode of FIG. 5, with the addition of the nonionic water-absorbing polymer, on the contrary, the metallic Zn shown in white in the figure was evenly accumulated, presuming that the negative electrode was significantly inhibited from being changed in its morphology (macroscopic shape change) and that the reaction uniformly proceeded throughout.

TABLE 1

| | Negative electrode composition | | | | | Average particle diameter of nonionic | |
|---|---|---|---|---|---|---|---|
| | ZnO particles (parts by weight) | Zn particles (parts by weight) | $In_2O_3$ (parts by weight) | $Bi_2O_3$ (parts by weight) | Nonionic water-absorbing polymer (parts by weight) | water-absorbing polymer D50 (μm) | Cycle characteristics |
| Example 1* | 100 | 5.7 | 0 | 0 | 0 | 50 | 550 |
| Example 2 | 100 | 5.7 | 0 | 0 | 0.05 | 50 | 580 |
| Example 3 | 100 | 5.7 | 0 | 0 | 0.10 | 50 | 760 |
| Example 4 | 100 | 5.7 | 0 | 0 | 0.5 | 50 | 820 |
| Example 5 | 100 | 5.7 | 0 | 0 | 1 | 50 | 800 |
| Example 6 | 100 | 5.7 | 0 | 0 | 3 | 50 | 1100 |
| Example 7 | 100 | 5.7 | 0 | 0 | 6 | 50 | 600 |
| Example 8 | 100 | 5.7 | 0 | 0 | 9 | 50 | 550 |
| Example 9* | 100 | 50 | 0 | 0 | 0 | 50 | 670 |
| Example 10 | 100 | 50 | 0 | 0 | 0.05 | 50 | 780 |
| Example 11 | 100 | 50 | 0 | 0 | 0.10 | 50 | 780 |
| Example 12 | 100 | 50 | 0 | 0 | 0.5 | 50 | 1070 |
| Example 13 | 100 | 50 | 0 | 0 | 1 | 50 | 1050 |
| Example 14 | 100 | 50 | 0 | 0 | 3 | 50 | 750 |
| Example 15 | 100 | 50 | 0 | 0 | 6 | 50 | 700 |
| Example 16 | 100 | 50 | 0 | 0 | 9 | 50 | 500 |
| Example 17 | 100 | 5.7 | 0 | 0 | 0.01 | 130 | 550 |
| Example 18 | 100 | 5.7 | 0 | 0 | 0.05 | 130 | 570 |

TABLE 1-continued

| | Negative electrode composition | | | | | Average particle diameter of nonionic | |
|---|---|---|---|---|---|---|---|
| | ZnO particles (parts by weight) | Zn particles (parts by weight) | $In_2O_3$ (parts by weight) | $Bi_2O_3$ (parts by weight) | Nonionic water-absorbing polymer (parts by weight) | water-absorbing polymer D50 (μm) | Cycle characteristics |
| Example 19 | 100 | 5.7 | 0 | 0 | 0.10 | 130 | 600 |
| Example 20 | 100 | 5.7 | 0 | 0 | 3 | 130 | 550 |
| Example 21 | 100 | 50 | 0 | 0 | 0.01 | 130 | 700 |
| Example 22 | 100 | 50 | 0 | 0 | 0.05 | 130 | 820 |
| Example 23 | 100 | 50 | 0 | 0 | 0.10 | 130 | 960 |
| Example 24 | 100 | 50 | 0 | 0 | 3 | 130 | 700 |

*denotes Comparative Example.

TABLE 2

| | Negative electrode composition | | | | | Average particle diameter of nonionic | |
|---|---|---|---|---|---|---|---|
| | ZnO particles (parts by weight) | Zn particles (parts by weight) | $In_2O_3$ (parts by weight) | $Bi_2O_3$ (parts by weight) | Nonionic water-absorbing polymer (parts by weight) | water-absorbing polymer D50 (μm) | Cycle characteristics |
| Example 25* | 100 | 50 | 0 | | 0 | 50 | 670 |
| Example 26* | 100 | 50 | 1 | 0 | 0 | 50 | 450 |
| Example 27 | 100 | 50 | 1 | 0 | 0.01 | 50 | 500 |
| Example 28 | 100 | 50 | 1 | 0 | 0.05 | 50 | 700 |
| Example 29 | 100 | 50 | 1 | 0 | 0.10 | 50 | 1050 |
| Example 30 | 100 | 50 | 1 | 0 | 1 | 50 | 1050 |
| Example 31 | 100 | 50 | 1 | 0 | 3 | 50 | 900 |
| Example 32 | 100 | 50 | 1 | 0 | 6 | 50 | 400 |
| Example 33* | 100 | 50 | 0 | 1 | 0 | 50 | 775 |
| Example 34* | 100 | 50 | 0 | 3 | 0 | 50 | 1000 |
| Example 35 | 100 | 50 | 0 | 0.5 | 0.5 | 50 | 970 |
| Example 36 | 100 | 50 | 0 | 1 | 0.5 | 50 | 1130 |
| Example 37 | 100 | 50 | 0 | 3 | 0.5 | 50 | 1040 |
| Example 38 | 100 | 50 | 0 | 6 | 0.5 | 50 | 980 |
| Example 39 | 100 | 50 | 0 | 12 | 0.5 | 50 | 540 |
| Example 40 | 100 | 50 | 0 | 3 | 1 | 50 | 1450 |
| Example 41 | 100 | 50 | 1 | 0 | 0.01 | 130 | 550 |
| Example 42 | 100 | 50 | 1 | 0 | 0.05 | 130 | 700 |
| Example 43 | 100 | 50 | 1 | 0 | 0.10 | 130 | 1050 |
| Example 44 | 100 | 50 | 1 | 0 | 1 | 130 | 1000 |
| Example 45 | 100 | 50 | 1 | 0 | 3 | 130 | 600 |
| Example 46 | 100 | 50 | 1 | 0 | 6 | 130 | 450 |

*denotes Comparative Example.

TABLE 3

| | Negative electrode composition | | | | | | |
|---|---|---|---|---|---|---|---|
| | ZnO particles | Zn particles | $In_2O_3$ | $Bi_2O_3$ | Ionic water-absorbing polymer | | |
| | (parts by weight | (parts by weight) | (parts by weight) | (parts by weight) | Polymer type | Amount added (parts by weight) | Cycle characteristics |
| Example 47* | 100 | 5.7 | 0 | 0 | — | 0 | 550 |
| Example 48* | 100 | 5.7 | 0 | 0 | Polyacrylic acid | 1 | 400 |
| Example 49* | 100 | 5.7 | 0 | 0 | Potassium polyacrylate | 1 | 400 |
| Example 50* | 100 | 5.7 | 0 | 0 | Potassium polyacrylate | 3 | 350 |

*denotes Comparative Example.

What is claimed is:

1. A negative electrode for use in a zinc secondary battery, comprising:

a negative electrode active material comprising ZnO particles and Zn particles, and a nonionic water-absorbing polymer, wherein the negative electrode comprises the nonionic water-absorbing polymer in an amount of 0.07 to 6.0 parts by weight on a solid basis, based on the content of the ZnO particles being 100 parts by weight, and wherein the negative electrode active material is in direct contact with the nonionic water-absorbing polymer.

2. The negative electrode according to claim 1, wherein the nonionic water-absorbing polymer is at least one selected from the group consisting of a polyalkylene oxide-based water-absorbing resin, a polyvinylacetamide-based water-absorbing resin, polyvinyl alcohol (PVA resin), and polyvinyl butyral (PVB resin).

3. The negative electrode according to claim 1, wherein the nonionic water-absorbing polymer is a polyalkylene oxide-based water absorbing resin.

4. The negative electrode according to claim 1, wherein the nonionic water-absorbing polymer is in a particulate form having a particle size of 10 to 200 μm.

5. The negative electrode according to claim 1, wherein the nonionic water-absorbing polymer has characteristics of change in liquid absorbency in response to variation of pH.

6. The negative electrode according to claim 1, comprising the Zn particles in an amount of 1.0 to 87.5 parts by weight, based on the content of the ZnO particles being 100 parts by weight.

7. The negative electrode according to claim 1, further comprising one or more metal elements selected from the group consisting of In and Bi.

8. The negative electrode according to claim 7, wherein the content of In is 0 to 2 parts by weight in terms of oxide, and the content of Bi is 0 to 6 parts by weight in terms of oxide, based on the content of the ZnO particles being 100 parts by weight.

9. The negative electrode according to claim 7, wherein the metal element is contained in the form of oxide particles.

10. The negative electrode according to claim 1, wherein the negative electrode is a sheet-like pressed product.

11. A zinc secondary battery, comprising:

a positive electrode, the negative electrode according to claim 1, a separator separating the positive electrode from the negative electrode so as to be capable of conducting hydroxide ions therethrough, and an electrolytic solution.

12. The zinc secondary battery according to claim 11, wherein the separator is a layered double hydroxide (LDH) separator.

13. The zinc secondary battery according to claim 12, wherein the LDH separator is composited with a porous substrate.

14. The zinc secondary battery according to claim 11, wherein the positive electrode comprises nickel hydroxide and/or nickel oxyhydroxide whereby the zinc secondary battery forms a nickel-zinc secondary battery.

15. The zinc secondary battery according to claim 11, wherein the positive electrode is an air electrode whereby the zinc secondary battery forms a zinc-air secondary battery.

* * * * *